(12) United States Patent
Vargantwar

(10) Patent No.: US 8,149,788 B1
(45) Date of Patent: Apr. 3, 2012

(54) WIRELESS HANDOFFS BASED UPON ACTIVITY CORRELATION

(75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 255 days.

(21) Appl. No.: 12/512,292

(22) Filed: Jul. 30, 2009

(51) Int. Cl.
*H04W 4/00* (2009.01)

(52) U.S. Cl. ........................................ 370/331; 455/436

(58) Field of Classification Search .......................... None
See application file for complete search history.

(56) References Cited

U.S. PATENT DOCUMENTS

| | | | | |
|---|---|---|---|---|
| 6,681,115 | B1* | 1/2004 | McKenna et al. | 455/517 |
| 2001/0055969 | A1* | 12/2001 | Bonta et al. | 455/436 |
| 2005/0286470 | A1* | 12/2005 | Asthana et al. | 370/331 |
| 2008/0064400 | A1* | 3/2008 | Benco et al. | 455/436 |
| 2009/0097451 | A1* | 4/2009 | Gogic | 370/331 |
| 2011/0103279 | A1* | 5/2011 | Srinivasan et al. | 370/311 |

* cited by examiner

*Primary Examiner* — Phirin Sam

(57) ABSTRACT

What is disclosed is a method of operating a wireless communication system. The method includes exchanging communications for a session between a wireless communication device and a destination through a serving access node, receiving a handoff request to handoff the session from the serving access node to a target access node, and selecting the target access node from a plurality of access nodes based upon a correlation between activities of the wireless communication device, one of the plurality of access nodes, and the serving access node.

20 Claims, 4 Drawing Sheets

WIRELESS HANDOFFS BASED UPON ACTIVITY CORRELATION

TECHNICAL FIELD

Aspects of the disclosure are related to the field of communications, and in particular, handoff of wireless communication devices between access nodes in wireless communication networks.

TECHNICAL BACKGROUND

Wireless communication networks typically include wireless communication devices which, via access nodes, communicate over wireless links with further communication networks, equipment, and destinations. In many examples of wireless communication systems, the access nodes usually come in different varieties to serve differently sized geographic areas or provide communication services to a different number of wireless communication devices. In typical examples, a macrocell access node can serve a large geographic area and handle a large number of simultaneous wireless communication device sessions, such as a part of a metro-wide wireless communication network of a communication service provider. A femtocell access node typically serves a smaller geographic area—many times limited to an office or house—and can be a consumer device able to be installed and easily moved by an end user. Also, a femtocell typically handles a much smaller number of simultaneous wireless communication device sessions than a macrocell.

In many examples, access nodes use various identifiers associated with each access node in the transfer of communications with wireless communication devices. These identifiers could be pseudorandom number or pseudorandom noise (PN) codes to allow energy associated with communications transferred by access nodes to be spread over a larger signal bandwidth, for enhanced security, and for other reasons. In typical examples of macrocells, many identifiers are distributed across a large geographic area and geographically adjacent macrocells do not use similar identifiers to avoid interference. However, in many examples of smaller access nodes, such as femtocells, some identifiers are shared by many other femtocells and a small geographic location may contain femtocells with similar associated identifiers. Due to the non-unique usage of the identifiers by certain types of access nodes, communication sessions many times cannot be handed off successfully between the access nodes, leading to dropped calls and a poor user experience.

OVERVIEW

What is disclosed is a method of operating a wireless communication system. The method includes exchanging communications for a session between a wireless communication device and a destination through a serving access node, receiving a handoff request to handoff the session from the serving access node to a target access node, and selecting the target access node from a plurality of access nodes based upon a correlation between activities of the wireless communication device, one of the plurality of access nodes, and the serving access node.

What is also disclosed is a wireless communication system. The wireless communication system includes a serving wireless access node, a wireless communication configured to exchange communications for a session between with a destination through the serving access node, and a controller node configured to receive a handoff request to handoff the session from the serving access node to a target access node. The controller node is also configured to select the target access node from a plurality of access nodes based upon a correlation between activities of the wireless communication device, one of the plurality of access nodes, and the serving access node.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
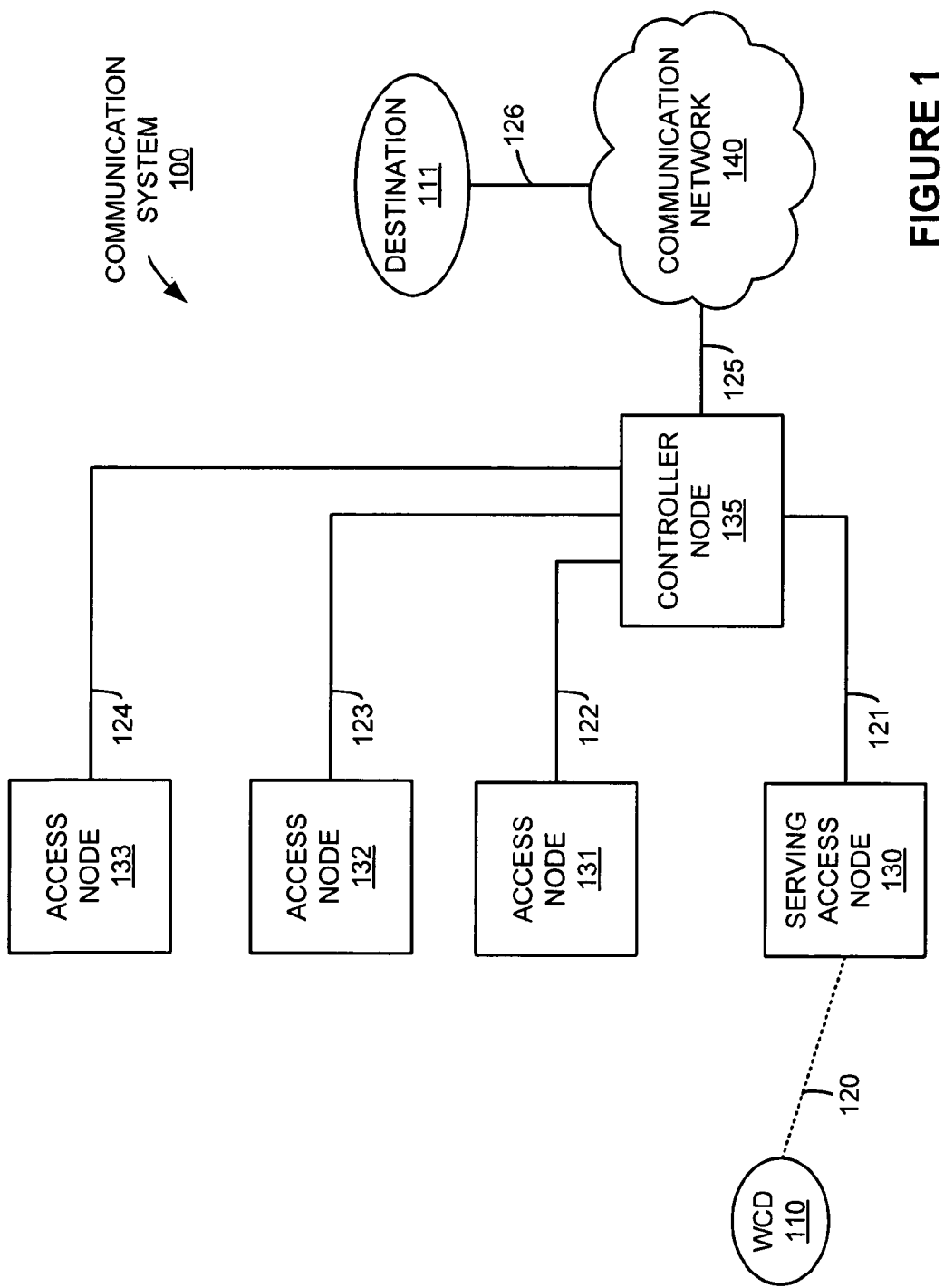
FIG. 1 is a system diagram illustrating a communication system.

FIG. 1 is a system diagram illustrating communication system 100. Communication system 100 includes wireless communication device (WCD) 110, destination 111, access nodes 130-133, controller node 135, and communication network 140. Wireless communication device 110 and access node 130 communicate over wireless link 120. Access nodes 130-133 each communicate with controller node 135 over links 121-124, respectively. Controller node 135 and communication network 140 communicate over link 125. Communication network 140 and destination 111 communicate over link 126.

In this example, wireless communication device 110 is initially registered for wireless communication services through access node 130, and thus access node 130 is considered a serving access node. Wireless communication device 110 can also communicate with access nodes 131-133 after a handoff process as described herein is initiated to register for wireless communication services through an individual one of access nodes 131-133.

Figure 2:
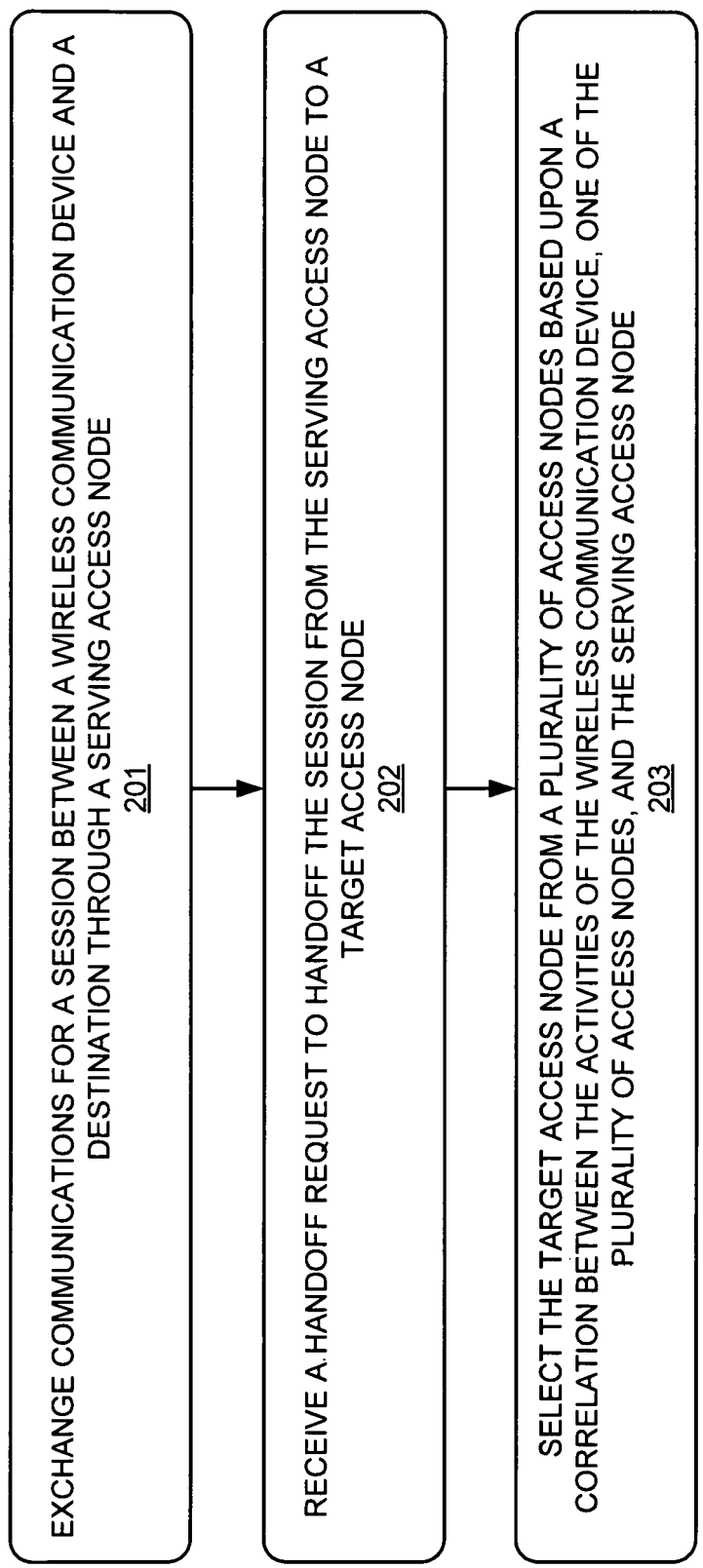
FIG. 2 is a flow diagram illustrating a method of operation of a communication system.

FIG. 2 is a flow diagram illustrating a method of operation of communication system 100. The operations in FIG. 2 are referenced herein parenthetically. In FIG. 2, wireless communication device 110 and destination 111 exchange (201) communications for a session through serving access node 130. In this example, the session could include a communication session which includes user communications or other communications. Controller node 135 receives (202) a handoff request to handoff the session from serving access node 130 to a target access node. Controller node 135 selects (203) the target access node from among access nodes 131-133 based upon a correlation between the activities of wireless communication device 110, serving access node 130, and one of access nodes 131-133.

In this example, handoff coordination is handled by controller node 135, and access nodes 130-133 can communicate with controller node 135 for the handoff coordination. In further examples, a handoff is then performed to continue the session between wireless communication device 110 and destination 111 through the selected target access node. Further communications of the session can then be exchanged between wireless communication device 110 and destination 111 through the selected target access node.

Referring back to FIG. 1, wireless communication devices (WCD) 110 comprises radio frequency (RF) communication circuitry and an antenna. The RF communication circuitry typically includes amplifiers, filters, modulators, and signal processing circuitry. In many examples, wireless communication device 110 includes circuitry and equipment to exchange communications with access node 130-133 over wireless links. Wireless communication device 110 may also include a user interface, memory device, computer-readable storage medium, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof.

Destination 111 may be a telephone, mobile wireless telephone, computer, e-book, mobile Internet appliance, wireless network interface card, media player, game console, or some other communication apparatus, including combinations thereof. In some examples, destination 111 is a telephone on the public switched telephone network (PSTN), and could reside on a local circuit of the PSTN, such as a home, business, or other location.

Access nodes 130-133 each comprise RF communication and control circuitry and an antenna. The RF communication circuitry typically includes amplifiers, filters, RF modulators, and signal processing circuitry. In many examples, access nodes 130-133 each include equipment to exchange communications with wireless communication device 110 over wireless links, and route communications between communication network 140 and wireless communication device 110. Access nodes 130-133 may also each comprise a router, server, memory device, software, processing circuitry, cabling, power supply, network communication interface, physical structural support, or some other communication apparatus. Access nodes 130-133 could each be a base station, base transceiver station, macrocell, microcell, picocell, femtocell, Internet access node, telephony service node, wireless data access point, wireless router, or some other wireless communication system, including combinations thereof. In typical examples, access nodes 130-133 each have a limited geographic coverage area over which they each can provide communication services to wireless communication devices. Although four access nodes are shown in FIG. 1, it should be understood that a different number of access nodes could be included.

Controller node 135 includes equipment to monitor and control the operations of access nodes 130-133, including coordinating handoffs of wireless communication devices. Controller node 135 also includes equipment to route communications between access nodes 130-133 and communication network 140. Controller node 135 could include base station controllers (BSC), mobile switching centers (MSC), radio node controllers (RNC), call processing systems, authentication, authorization and accounting (AAA) equipment, access service network gateways (ASN-GW), application servers, routers, processing systems, as well as other equipment, including combinations thereof.

Communication network 140 comprises the core network of a wireless communications provider, and could include routers, gateways, telecommunication switches, servers, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof. In some examples, communication network 140 includes further access nodes and associated equipment for providing communication services to many wireless communication devices across a geographic region.

Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), High Speed Packet Access (HSPA), wireless local-area network, Wireless Fidelity (Wi-Fi) network, or some other wireless communication format, including combinations, improvements, or variations thereof.

Communication links 121-126 each use metal, glass, optical, air, space, or some other material as the transport media. Communication links 121-126 could each use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-126 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication links 121-126 could each be direct links or may include intermediate networks, systems, or devices. In many examples, the portion of wireless link 120 as transmitted by the associated wireless communication device is referred to an uplink or reverse link of the wireless link, while the portion as transmitted by an access node is referred to as a downlink or forward link of the wireless link.

Figure 3:
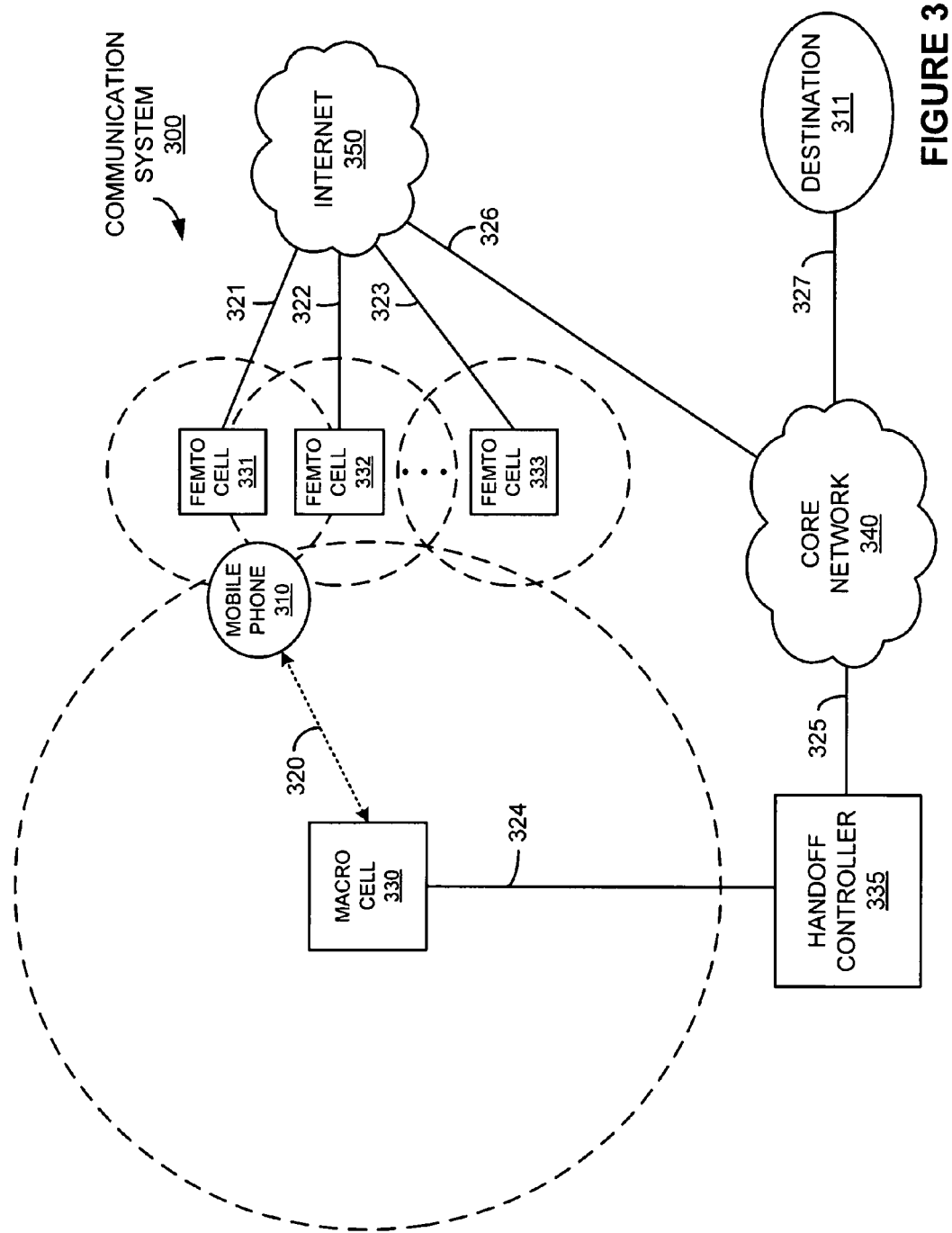
FIG. 3 is a system diagram illustrating a communication system.

FIG. 3 is a system diagram illustrating communication system 300. FIG. 3 includes mobile phone 310, destination 311, macrocell 330, femtocells 331-333, handoff controller 335, core network 340, and Internet 350. Macrocell 330 and mobile phone 310 communicate over wireless link 320. Macrocell 330 and handoff controller 335 communicate over link 324. Femtocells 331-333 each communicate over Internet 350 with links 321-323, respectively. Handoff controller 335 and core network 340 communicate over link 325. Internet 350 and core network 340 communicate over link 326. Core network 340 and destination 311 communicate over link 327.

In this example, mobile phone 110 is a mobile wireless communication device capable of placing voice calls. Macrocell 330 and femtocells 331-333 are access nodes, and each include wireless communications equipment capable of communicating with and providing communication service to wireless communication devices. Core network 340 is a core network of a wireless communication provider in this example. Core network 340 could include further access nodes, routers, gateways, controller systems, processing systems, or other communication equipment. Wireless link 320 employs the CDMA wireless protocol in this example. Links 321-323 and 326 comprise links communicating with the Internet protocol (IP), and each could be a broadband data link, including digital subscriber lines (DSL), cable television data links, circuit-switched links, Ethernet, or other links. Links 324-325 are T1 links in this example. Link 327 could comprise a local loop connection of a public switched telephone network (PSTN), a wireless link, or other end-user links, and could include other intermediate equipment and links. Handoff controller 335 comprises a base station controller (BSC).

In this example, mobile phone 310 is initially registered for wireless communication services through macrocell 330, and thus macrocell 330 is considered a serving access node. Mobile phone 310 could also communicate with femtocells 331-333, but typically after a handoff process as described herein is completed for wireless communication services through an individual one of femtocells 331-333.

As shown in FIG. 3, macrocell 330 and femtocells 331-333 each have a limited geographic range over which they each can provide communication services to wireless communication devices. The limited range is indicated by the circular-shaped wireless coverage areas in FIG. 3. Although circular regions defining the coverage areas are shown in FIG. 3, it should be understood that the coverage areas could be of other shapes and configurations, as determined by geographic features, empirical data, radio frequency (RF) conditions, the equipment of macrocell 330 and femtocells 331-333, or by other factors, including combinations thereof.

Access nodes can come in different varieties to serve differently sized geographic areas or provide communication services to a different number of wireless communication devices. In typical examples, a macrocell can serve a large geographic area and handle a large number of simultaneous wireless communication device sessions, such as a part of a metro-wide wireless communication network of a communication service provider. Macrocell base stations are typically owned and operated by a communication service provider, and are associated with permanent or semi-permanent antenna structures. A femtocell typically serves a smaller geographic area—many times limited to an office or house—and can be a consumer device able to be installed and easily moved by an end user. In many examples, a femtocell handles a much smaller number of simultaneous wireless communication device sessions than a macrocell.

In many examples, access nodes use various identifiers and encoding schemes in the transfer of communications with wireless communication devices. In CDMA examples, these identifiers and encoding schemes can employ pseudorandom number or pseudorandom noise (PN) codes to allow energy associated with communications transferred by access nodes to be spread over a larger signal bandwidth, for enhanced security, and for other reasons. Other wireless protocols can employ different identifiers and encoding schemes. In typical examples of macrocells, a set of encoding identifiers, such as PN codes, are distributed across a large geographic area and geographically adjacent macrocells do not use similar PN codes to avoid interference. However, in many examples of smaller access nodes, such as femtocells, the encoding identifiers, such as PN codes, are shared by many other femtocells and a small geographic location may contain femtocells using similar identifiers.

Also, in many examples of wireless communication protocols, wireless communication devices monitor an access channel of an access node prior to establishing communications through the access node. However, when an encoding identifier is employed on communications over the access channel, the wireless communication device cannot properly monitor the access channel unless the encoding identifier of the access channel is known by the wireless communication device. Access channels may also employ different encoding identifiers than channels used for user communications. These encoding identifiers, such as PN codes, could be of different sizes or lengths. Additionally, the access channels can be used to transfer communication overhead information, call requests, device registration information, text messages, network alerts, incoming calls, information on channel assignments for user communications, among other information. In other examples, a pilot channel is monitored by wireless communication devices seeking to initiate communication through the access node. In examples of pilot channels, encoding identifiers, such as PN codes, can be employed in a similar manner as described above for access channels.

Femtocells also typically employ different communication backhaul mechanisms than macrocells. In examples of macrocells, permanent or semi-permanent commercial-grade or non-consumer backhaul links are used, such as T1 connections, leased circuits, or other backhaul connection types, to route communications between the access node and a controller node. However, in typical examples of femtocells, end-user or consumer-grade backhaul links are employed, such as broadband Internet connections such as DSL, cable television broadband Internet connections, consumer satellite Internet connections, local circuit phone lines, Ethernet, Wi-Fi, or other end-user Internet connections, to route communications between the femtocell over the Internet to a controller node. In some examples, a macrocell will have a fixed network address, while a femtocell will have a dynamic or changing network address.

Figure 4:
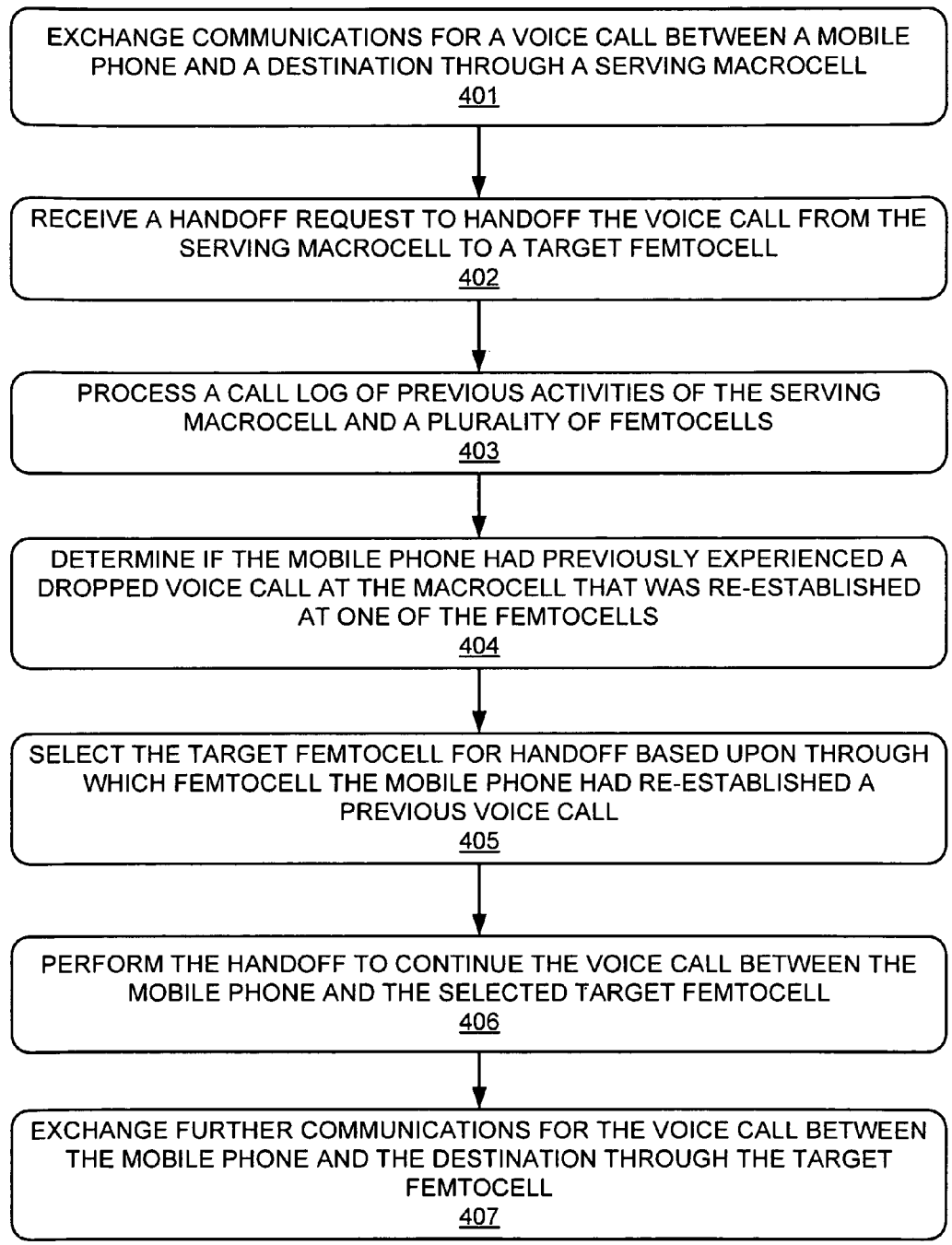
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, communication system 300 exchanges (401) communications for a voice call between mobile phone 310 and destination 311 through serving macrocell 330. In this example, the communications are exchanged over wireless link 320 between mobile phone 310 and macrocell 330, over link 324 between macrocell 330 and handoff controller 335, and over links 325 and 327 through core network 340. In further examples, an additional link could be used for user communications between macrocell 330 and core network 340, while link 324 is used for overhead and handoff communications between handoff controller 335 and macrocell 330.

Handoff controller 335 receives (402) a handoff request to handoff the voice call from the serving macrocell to a target femtocell. In this example, handoff coordination is handled by handoff controller 335, although in other examples different equipment in core network 340 could coordinate handoffs. Also in this example, macrocell 330 and femtocells 331-333 can each exchange communications with handoff controller 335 to coordinate handoff of wireless communication devices. The handoff communications are exchanged between each of femtocells 331-333 and handoff controller 335 over Internet 350 and through core network 340, while the handoff communications are exchanged between macrocell 330 and handoff controller 335 over link 324.

A handoff is a way to coordinate a change of a wireless communication device exchanging user communications through a present, or serving access node, to a target access node. In many examples, the handoff process is initiated due to signal strength changes of access nodes as detected by a wireless communication device or by an access node in communication with the wireless communication device. This signal strength change can be due to many factors, such as movement of the wireless communication device from the wireless coverage area of one access node to that of another access node, fluctuations in RF signal quality of the wireless communications, desired end-user or network quality of service levels, or other factors. After a handoff process, a wireless communication device will typically exchange user communications through the target access node and cease exchanging user communications through the serving access node, although in some examples user communications can be exchanged between both the serving access node and the target access node.

In further examples, a soft handoff technique is employed. In soft handoff, such as in the CDMA wireless protocol, a wireless communication device frequently make RF power measurements of communications received from a number of nearby access nodes. A list of access nodes is then maintained to indicate which access nodes are candidates for a soft handoff. The wireless communication device can request an access node be added to an active list of access nodes through which the wireless communication device can possibly exchange user communications. In the example shown in FIG. 3, a soft handoff request could include a request by mobile phone 310 to add a desired one of femtocells 331-333 into the active list of access nodes. The request (402) would be made to handoff controller 335, which could then determine if the soft handoff should proceed. Handoff controller 335 could then indicate to mobile phone 310 whether or not a soft handoff to the desired femtocell can continue.

To determine if the handoff should proceed, handoff controller 335 processes (403) a call log of previous activities or past activities of mobile phone 310, serving macrocell 330, and femtocells 331-333. The call log could be stored and maintained by handoff controller 335, or could be associated with other equipment in core network 340. The call log is processed to determine (404) if mobile phone 310 had previously experienced a dropped voice call at macrocell 330 that was re-established at one of femtocells 331-333.

As discussed above, access nodes can each have associated PN codes which are used to encode access channels and user communications between wireless communication devices and the access nodes. Additionally, a PN code associated with each access node is typically used to identify and decode an access channel or pilot channel of a desired target access node for handoff. In examples of femtocells, a similar or same PN code could potentially be associated with many femtocells in a small geographic area. This is unlike macrocells, where a centralized PN code distribution method is typically employed to prevent similar PN codes from being used on nearby access nodes and to allow wireless communication devices to uniquely identify a desired target access node for handoff.

Thus, because femtocells typically use non-unique associated PN codes, if mobile phone 310 attempts to handoff to a femtocell, handoff controller 335 cannot determine which target femtocell should exchange communications with mobile phone 310. Any present communication session between mobile phone 310 and macrocell 330 is thus not properly transitioned to another access node, and the present communication session is then typically dropped or terminated unintentionally if mobile phone 310 moves out of the wireless coverage area of macrocell 330. However, mobile phone 310 could then re-establish a new communication session at a femtocell. This new communication session could be a voice call to destination 311, where the dropped communication session was also a voice call to destination 311. In other examples, the dropped and re-established communication session are data communication sessions, and could each be identified by an associated destination network address, such as an IP address, Ethernet address, or other identifier. In many examples, the re-established communication session occurs within a short time of the dropped communication session, such as within one minute. In further examples, the re-established communication session is referred to as a re-originated communication session.

Handoff controller 335 then selects (405) the target femtocell for handoff based upon through which femtocell mobile phone 310 had re-established a previous voice call. The information regarding dropped and re-established voice calls or communication sessions is included in the call log in this example. In some examples, handoff controller 335 selects a target access node by selecting a backhaul link associated with the selected target access node. The backhaul link could be selected by determining an associated IP address, virtual private network (VPN) parameter, Ethernet address, network tunnel, access node identifier, or other identifying characteristic for the backhaul link. In further examples, the selected target access node is selected by determining a PN code associated with the selected target access node.

In this example, if femtocell 331 was associated with a prior re-established voice call after mobile phone 310 experienced a dropped a voice call, then handoff controller 335 could determine that femtocell 331 should be used for future handoffs with mobile phone 310 when macrocell 330 is the serving access node. If mobile phone 310 subsequently requests a handoff from macrocell 330 to femtocell 331 during another voice call, then handoff controller 335 could perform (406) then handoff to continue the voice call of mobile phone 310 through the selected target femtocell 331. Backhaul link 321 could then be selected when determining that femtocell 331 should be used for a handoff with mobile phone 310. As discussed above, backhaul link 321 could have an associated IP address, or other identifier used in the selection process. After the handoff is complete, further communications could be exchanged (407) for the voice call between mobile phone 310 and destination 311 through the selected target femtocell 331. The handoff would allow the voice call to continue uninterrupted between mobile phone 310 and destination 311 even though two different access nodes were used to exchange the voice call.

Advantageously, by selecting an access node as described herein based upon at least the activities of a wireless communication device, serving access node, and a plurality of potential target access nodes, then the encoding identifiers or PN codes associated with the serving and target access nodes could be the same. In many examples, a backhaul link associated with the target access node is chosen based upon correlation of previous activities so many potential access nodes, such as femtocells, could share same encoding identifier or PN code.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:

exchanging communications for a session between a wireless communication device and a destination through a serving access node;

receiving a handoff request to handoff the session from the serving access node to a target access node;

selecting the target access node from a plurality of access nodes based upon a correlation between previous activities of the wireless communication device, one of the plurality of access nodes, and the serving access node.

2. The method of claim 1, further comprising:
performing a handoff to continue the session between the wireless communication device and the destination through the target access node;
exchanging further communications for the session between the wireless communication device and the destination through the target access node.

3. The method of claim 1, wherein the correlation between previous activities comprises determining the one of the plurality of access nodes through which the wireless communication device registered after a prior session was interrupted through the serving access node.

4. The method of claim 1, wherein the correlation between previous activities comprises determining the one of the plurality of access nodes through which the wireless communication device initiated a re-established session after a prior session was interrupted through the serving access node.

5. The method of claim 4, wherein the prior session comprises a first voice call to a called number by the wireless communication device through the serving access node; and
wherein the re-established session comprises a second voice call to the called phone number made by the wireless communication device through the one of the plurality of access nodes.

6. The method of claim 4, wherein the prior session comprises a first data session initiated by the wireless communication device through the serving access node; and
wherein the re-established session comprises a second data session initiated by the wireless communication device through the one of the plurality of access nodes.

7. The method of claim 1, further comprising:
processing a log of past activity between the wireless communication device, the plurality of access nodes, and the serving access node to determine the correlation between the previous activities of the wireless communication device, one of the plurality of access nodes, and the serving access node.

8. The method of claim 1, wherein at least two of the plurality of access nodes share a same associated pseudorandom number (PN) code.

9. The method of claim 2, wherein the selected target access node comprises a femtocell configured to interface with an Internet connection to exchange the further communications of the session with the destination.

10. The method of claim 2, wherein the serving access node comprises a macrocell configured to interface with a T-1 connection to exchange the communications of the session, and wherein the selected target access node comprises a base station configured to interface with an Internet connection to exchange the further communications of the session with the destination.

11. A wireless communication system, comprising:
a serving wireless access node;
a wireless communication device configured to exchange communications for a session between with a destination through the serving access node;
a controller node configured to receive a handoff request to handoff the session from the serving access node to a target access node, and select the target access node from a plurality of access nodes based upon a correlation between previous activities of the wireless communication device, one of the plurality of access nodes, and the serving access node.

12. The wireless communication system of claim 11, comprising:
the controller node configured to perform a handoff to continue the session between the wireless communication device and the destination through the target access node;
the wireless communication device configured to exchange further communications for the session between the wireless communication device and the destination through the target access node.

13. The wireless communication system of claim 11, wherein the correlation between previous activities comprises determining the one of the plurality of access nodes through which the wireless communication device registered after a prior session was interrupted through the serving access node.

14. The wireless communication system of claim 11, wherein the correlation between previous activities comprises determining the one of the plurality of access nodes through which the wireless communication device initiated a re-established session after a prior session was interrupted through the serving access node.

15. The wireless communication system of claim 14, wherein the prior session comprises a first voice call to a called number by the wireless communication device through the serving access node; and
wherein the re-established session comprises a second voice call to the called phone number made by the wireless communication device through the one of the plurality of access nodes.

16. The wireless communication system of claim 14, wherein the prior session comprises a first data session initiated by the wireless communication device through the serving access node; and
wherein the re-established session comprises a second data session initiated by the wireless communication device through the one of the plurality of access nodes.

17. The wireless communication system of claim 11, comprising:
the controller node configured to process a log of past activity between the wireless communication device, the plurality of access nodes, and the serving access node to determine the correlation between the previous activities of the wireless communication device, one of the plurality of access nodes, and the serving access node.

18. The wireless communication system of claim 11, wherein at least two of the plurality of access nodes share a same associated pseudorandom number (PN) code.

19. The wireless communication system of claim 12, wherein the selected target access node comprises a femtocell configured to interface with an Internet connection to exchange the further communications of the session with the destination.

20. The wireless communication system of claim 12, wherein the serving access node comprises a macrocell configured to interface with a T-1 connection to exchange the communications of the session, and wherein the selected target access node comprises a base station configured to interface with an Internet connection to exchange the further communications of the session with the destination.

* * * * *